US008678282B1

(12) United States Patent
Black et al.

(10) Patent No.: US 8,678,282 B1
(45) Date of Patent: Mar. 25, 2014

(54) AIM ASSIST HEAD-MOUNTED DISPLAY APPARATUS

(75) Inventors: Jason Black, Orlando, FL (US); Gregory A. Harrison, Oviedo, FL (US); David Alan Smith, Cary, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 2 days.

(21) Appl. No.: 13/304,780

(22) Filed: Nov. 28, 2011

Related U.S. Application Data

(60) Provisional application No. 61/417,548, filed on Nov. 29, 2010.

(51) Int. Cl.
*G06F 19/00* (2011.01)
(52) U.S. Cl.
USPC ........... 235/417; 235/404; 235/407; 235/408; 235/13; 235/414
(58) Field of Classification Search
USPC .......... 235/404, 407, 408, 413–417; 701/213; 42/1.01; 348/158; 398/106; 359/529; 382/293; 434/19
See application file for complete search history.

(56) References Cited

U.S. PATENT DOCUMENTS

| | | | |
|---|---|---|---|
| 5,641,288 A * | 6/1997 | Zaenglein, Jr. | ................. 434/21 |
| 5,834,676 A | 11/1998 | Elliott | |
| 2008/0063400 A1* | 3/2008 | Hudson et al. | ................ 398/106 |
| 2008/0198459 A1* | 8/2008 | Fergason | ...................... 359/529 |
| 2009/0040308 A1* | 2/2009 | Temovskiy | ................... 348/158 |
| 2009/0112469 A1* | 4/2009 | Lapidot et al. | ................ 701/213 |
| 2011/0289810 A1* | 12/2011 | D'Souza et al. | ............... 42/1.01 |
| 2012/0068913 A1* | 3/2012 | Bar-Zeev et al. | ................. 345/8 |

OTHER PUBLICATIONS

Livingston et al., "An Augmented Reality System for Military Operations in Urban Terrain," Proc of I/ITSEC '02, Orlando FL, Dec. 2-5, 2002.
Vanden Brook, T., "Device Helps Pinpoint Snipers: Technology Is Critical for U.S. Combat Troops," USA Today, Wednesday, Mar. 2, 2011.

* cited by examiner

*Primary Examiner* — Sonji Johnson
(74) *Attorney, Agent, or Firm* — Withrow & Terranova, PLLC

(57) ABSTRACT

Systems, apparatus, and methods are provided which: (a) receive wired or wireless transmission of information regarding an orientation of a weapon; (b) receive wired or wireless transmission of information regarding an orientation of a viewing area of a head-mounted display apparatus; (c) process ballistic information of ammunition to be fired by the weapon and the information regarding the orientations of the weapon and the viewing area to obtain a calculated endpoint of the ammunition to be fired by the weapon; and (d) display an icon (e.g., a crosshair) representative of the endpoint of the ammunition in the viewing area of the head-mounted display apparatus.

18 Claims, 6 Drawing Sheets

AIM ASSIST HEAD-MOUNTED DISPLAY APPARATUS

CROSS-REFERENCE TO RELATED APPLICATION

This application claims priority to U.S. Provisional Application Ser. No. 61/417,548 (entitled Aim Assist Head Mount Display, filed Nov. 29, 2010) which is incorporated herein by reference.

FIELD

This disclosure relates to head-mounted display apparatus and, in particular, to head-mounted display apparatus for use with a weapon, e.g., a firearm, mortar, or other type of weapon which imparts motion to a projectile (hereinafter referred to collectively as "weapons"), where the head-mounted display apparatus displays to a user the endpoint (impact point) of the weapon's projectile (the endpoint of the weapon's ammunition) within a viewing area, i.e., within the user's forward field of view (either simulated or non-simulated).

BACKGROUND

A head-mounted display such as a helmet-mounted display or eyeglass-mounted display (abbreviated herein as a "HMD") is a display device worn on the head of an individual that has one or more small display devices located near one eye or, more commonly, both eyes of the user.

Some HMDs display only simulated (computer-generated) images, as opposed to real-world images, and accordingly are often referred to as "virtual reality" or immersive HMDs. Other HMDs superimpose (combine) a simulated image upon a non-simulated, real-world image. The combination of non-simulated and simulated images allows the HMD user to view the world through, for example, a visor or eyepiece on which additional data relevant to the task to be performed is superimposed onto the forward field of view (FOV) of the user. This superposition is sometimes referred to as "augmented reality" or "mixed reality."

Combining a non-simulated, real-world view with a simulated image can be achieved using a partially-reflective/partially-transmissive optical surface (a "beam splitter") where the surface's reflectivity is used to display the simulated image as a virtual image (in the optical sense) and the surface's transmissivity is used to allow the user to view the real world directly (referred to as an "optical see-through system"). Alternatively, a direct view display having transmissive properties, e.g., a transparent organic light-emitting diode display (TOLED), can be used to combine a non-simulated, real-world view with a simulated image. Combining a real-world view with a simulated image can also be done electronically by accepting video of a real world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties, or using a direct view display, which likewise need not have transmissive properties.

From the foregoing, it can be seen that HMDs can provide the user with: (i) a combination of a simulated image and a non-simulated, real world image, (ii) a combination of a simulated image and a video image of the real world, or (iii) purely simulated images.

Sighting devices have long been used to help shooters improve the placement of shots fired from small-arms weapons. Small-arms weapons include those firearms that an individual may carry and use. Many handguns, for instance, include unmagnified iron sighting devices with horizontal and vertical reference points that allow a shooter to align the gun parallel to the shooter's line of sight. Other firearms, such as carbines, rifles, assault rifles and light machine guns, may include magnified sighting devices (which are also known as telescopic sights, or scopes) to provide a shooter with improved accuracy in aligning the barrel with the intended target. These magnified sighting devices are especially useful for hunters, sharpshooters, and others who find it advantageous to shoot at targets from a great distance. Successfully hitting any target depends on a shooter's ability to understand a bullet's likely flight path, or trajectory, referred to as ballistics, before the bullet is fired.

Further sighting devices have recently included the use of cameras mounted on weapons that provide a video input corresponding to where the weapon is aimed to a head mounted display. These types of devices allow a person to aim a gun around an obstacle without having to place their heads in a potential line of fire. The devices, however, do not provide endpoint information for the ammunition to be fired by the weapon and, in particular, do not provide endpoint information within the user's forward field of view.

The present disclosure addresses this existing need in the art by providing methods and apparatus that permit a user to operate a weapon while continuing to observe his/her forward field of view with a predicted endpoint for the weapon's ammunition upon firing being readily visible within the user's forward field of view (viewing area) even as the orientations of the weapon and/or the viewing area change over time.

SUMMARY

A system includes: (a) a viewing area, (b) a head-supported frame to support the viewing area in front of an eye of a user, and (c) a driver, e.g., a software driver, to display a visual indication in the viewing area corresponding to a calculated endpoint of ammunition for ballistics of ammunition associated with a separately oriented weapon, wherein the user sees the visual indication embedded in a 3D environment and the visual indication moves based on the orientations of the viewing area and the weapon.

An alternate system includes an architecture configured to receive wired or wireless transmission of an orientation of a weapon, to receive wired or wireless information regarding an orientation of a viewing area of a head-mounted display apparatus, to process the orientations of the weapon and the viewing area, and to display information regarding a calculated endpoint of ammunition to be fired from the weapon based on ballistics information for that ammunition.

A method includes (a) receiving wired or wireless transmission of information regarding an orientation of a weapon; (b) receiving wired or wireless transmission of information regarding an orientation of a viewing area of a head-mounted display apparatus; (c) processing ballistic information of ammunition to be fired by the weapon and the information regarding the orientations of the weapon and the viewing area to obtain a calculated endpoint of the ammunition to be fired by the weapon; and (d) displaying an icon (e.g., a crosshair) representative of the endpoint of the ammunition in the viewing area of the head-mounted display apparatus.

It is to be understood that both the foregoing general description and the following detailed description are merely exemplary of the invention and are intended to provide an overview or framework for understanding the nature and character of the invention. Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

In FIG. 5, the terrain being viewed is represented at 125, reference number 130 illustrates the expected endpoint, impact point or final destination of the weapon's ammunition, and reference number 120 is the representation of the endpoint in viewing area 105.

DETAILED DESCRIPTION

I. Head-Mounted Display Apparatus

Figure 1:
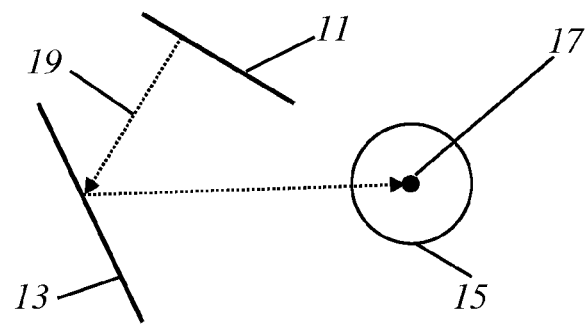
FIG. 1 is a schematic diagram showing basic components of an exemplary HMD, i.e., a display 11, a reflective surface 13, and a user's eye 15.

FIG. 1 shows the basic elements of one type of HMD which includes a display 11, a reflective optical surface 13, and an eye 15 having a center of rotation 17. As shown in this figure, light 19 from display 11 is reflected by surface 13 and enters the user's eye 15.

Figure 2:
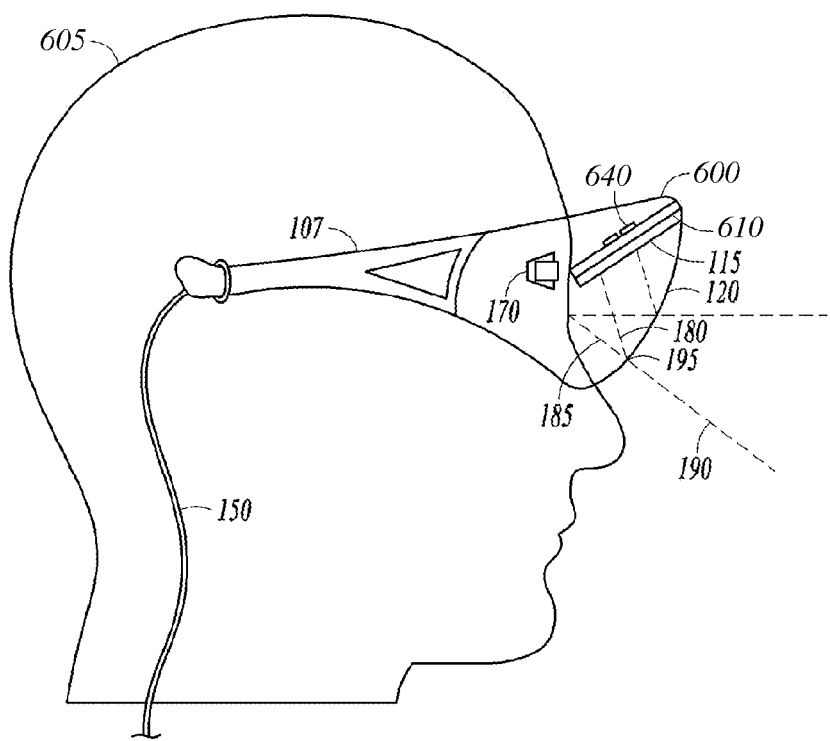
FIG. 2 is a side view representation of head-mounted display apparatus according to an example embodiment employing a reflective surface.
Figure 3:
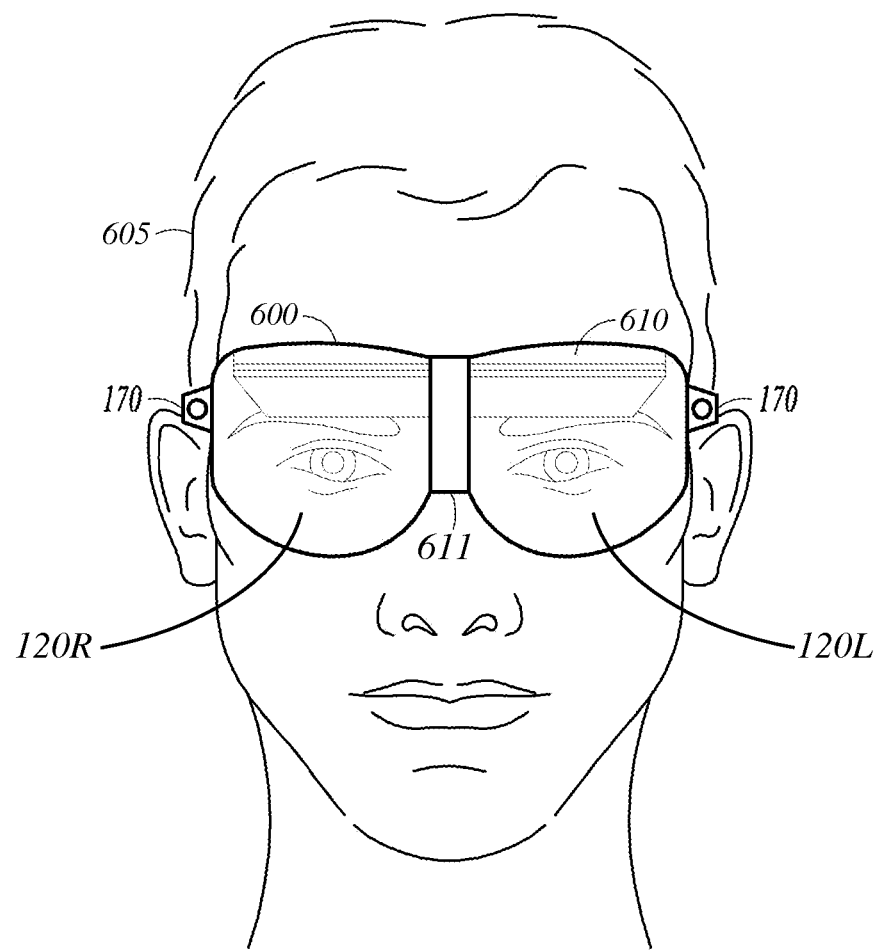
FIG. 3 is a front view representation of the head-mounted display apparatus of FIG. 2.

FIGS. 2 and 3 are, respectively, a side view and a front view of a head-mounted display apparatus 600 shown being worn by a user 605. The head-mounted display apparatus employs a reflective optical surface 120, e.g., a reflective optical surface of the type disclosed in commonly-assigned and co-pending U.S. patent application Ser. No. 13/211,372, filed on Aug. 17, 2011, in the names of G. Harrison, D. Smith, and G. Wiese, entitled "Head-Mounted Display Apparatus Employing One or More Reflective Optical Surfaces," the contents of which are incorporated herein by reference.

In one embodiment, the head-mounted display apparatus 600 can be, for example, an optical see-through, augmented reality, binocular viewer. In various embodiments, the aim assist systems disclosed herein will use such a HMD, it being understood that the principles discussed herein are equally applicable to optical see-through, augmented reality, monocular viewers, video see-through, augmented reality, binocular and monocular viewers, and binocular and monocular "virtual reality" systems.

As shown in FIGS. 2 and 3, the head-mounted display apparatus 600 includes a frame 107 adapted to be worn by the user and supported by the user's nose and ears in a manner similar to that in which eyeglasses are worn. In the embodiment of FIGS. 2-3, as well as in the other embodiments disclosed herein, the head-mounted display apparatus may have a variety of configurations and can, for example, resemble conventional goggles, glasses, helmets, and the like. In some embodiments, a strap may be used to hold the HMD's frame in a fixed position with respect to the eyes of the user. In general terms, the outside surface of the HMD package can assume any form that holds the HMD's display(s) and any associated optical systems in the required orientation with respect to the user's eyes.

The head-mounted display apparatus 600 includes at least one image display system 610 and, as shown in the embodiment of FIGS. 2 and 3, a reflective optical surface 120 which is curved. Surface 120 can be purely reflective or can have both reflective and transmissive properties, in which case, it can be thought of as a type of "beam splitter."

Surface 120 may completely surround one or both eyes, as well as the at least one image display system 610. In particular, the surface can curve around the sides of the eyes and toward the sides of the face so as to expand the available horizontal field of view. In one embodiment, the surface 120 may extend up to 180° or more (e.g., more than 200°). As illustrated in FIG. 3, the HMD may include two separate reflective surfaces 120R and 120L for the user's two eyes which are separately supported by the frame and/or a nasal ridge piece 611 (see below). Alternately, the HMD may employ a single reflective surface that serves both eyes with a single structure, some portions of which are viewed by both eyes and other portions of which are viewed by only one eye.

As noted immediately above and as illustrated in FIG. 3, the head-mounted display apparatus 600 can include a nasal ridge piece 611. The nasal ridge piece can be a vertical bar or wall which provides a separation between two reflective surfaces, one for each of the user's eye. The nasal ridge piece 611 can also provide a separation between the fields of view of the user's two eyes. In this way, the user's right eye can be shown a first representation of three dimensional physical reality in the environment by displaying a first image to the right eye via a first image display device and a first reflective surface, while the user's left eye is shown a second representation of three dimensional physical reality in the environment by displaying a second image to the left eye via a second image display device and a second reflective surface. A separate display device/reflective surface combination thus services each eye of the user, with each eye seeing the correct image for its location relative to the three dimensional physical reality in the environment. By separating the user's two eyes, the ridge piece 611 allows the image applied to each eye to be optimized independently of the other eye. In one embodiment, the nasal ridge piece's vertical wall may include two reflectors, one on each side, to allow the user to see imagery as he/she turns his/her eyes nasally, either to the left or to the right.

The at least one image display system 610 can be mounted inside the reflective surface 120 and may be horizontally disposed or at a slight angle with respect to the horizon. Alternatively, the at least one image display system can be located just outside of the reflective surface. The tilt or angle of the at least one image display system 610 or, more particularly, its at least one light-emitting surface, will in general be a function of the location of the pixels, images, and/or pieces of display information that are to be reflected from the surface 120.

In certain embodiments, the head-mounted display apparatus 600 is configured to create an interior cavity, with the reflective surface being reflective inward into the cavity. For a reflective surface having transmissive properties, the image or display information from the at least one image display system is reflected into the cavity and to the user's eye from the surface while, simultaneously, light also enters the cavity and the user's eye from the external world by passing through the reflective surface.

The head-mounted display apparatus includes a control system 640 which at a minimum includes a driver (display driver) to control the images that are displayed by the at least one image display system 610. Although shown separated from image display system 610 in FIG. 2, all or part of the control system can be integrated with the image display system, e.g., the display driver portion of the control system can be part of the image display system. More generally, control system 640 can be placed at a single location on the head-mounted display apparatus or can be distributed over different parts of the apparatus to, for example, balance the weight of the apparatus. Control system 640 and its interactions with other components of the information acquisition, processing, and display functions of the overall sniper finder system is discussed in more detail in connection with FIGS. 5-7 below.

As illustrated in FIG. 2, power and video to and from the head-mounted display apparatus 600 can be provided through a transmission cable 150 coupled to, for example, the control system 640 or through a wireless medium. A set of cameras 170 may be situated on opposite sides of the head-mounted display apparatus 600 to provide input to the control system to help control the computer generation of, for example, "augmented reality" scenes. The set of cameras 170 may be coupled to the control system to receive power and control signals and to provide video input to the control system's software.

The image display system used in the head-mounted display apparatus can take many forms, now known or subsequently developed. For example, the system can employ small high resolution liquid crystal displays (LCDs), light emitting diode (LED) displays, and/or organic light emitting diode (OLED) displays, including flexible OLED screens and, in the case of direct view HMDs (see below), transparent OLEDs. In particular, the image display system can employ a high-definition small-form-factor display device with high pixel density, examples of which may be found in the cell phone industry. A fiber-optic bundle can also be used in the image display system. In various embodiments, the image display system can be thought of as functioning as a small screen television. If the image display system produces polarized light (e.g., in the case where the image display system employs a liquid crystal display where all colors are linearly polarized in the same direction), and if the reflective surface is polarized orthogonally to the light emitted by the display, then light will not leak out of the reflective surface. The information displayed and the light source itself will accordingly not be visible outside of the HMD.

Overall operation of an exemplary embodiment of an optical system constructed in accordance with the present disclosure, specifically, an optical system for an "augmented reality" HMD, is illustrated by the ray-tracings of FIG. 2, specifically, light rays 180, 185, and 190. In this embodiment, reflective surface 120 has both reflective and transmissive properties. Using surface 120's transmissive properties, light ray 190 enters from the environment through the surface and proceeds towards the user's eye. From the same region of surface 120, light ray 180 is reflected by the surface (using the surface's reflective properties) and joins light ray 190 to create combined light ray 185 that enters the user's eye when the user looks in the direction of point 195, i.e., when the user's direction of gaze is in the direction of point 195. While so looking, the user's peripheral vision capabilities allow the user to see light from other points in the environment which pass through surface 120, again using the surface's transmissive properties.

The aim assist systems disclosed herein can also employ direct viewing of an image display system without an intervening reflective optical surface. If the image display system is transparent, the system can be of the augmented reality type. Otherwise, it will be immersive, but can include external world information through the use of one or more video cameras.

Figure 4:
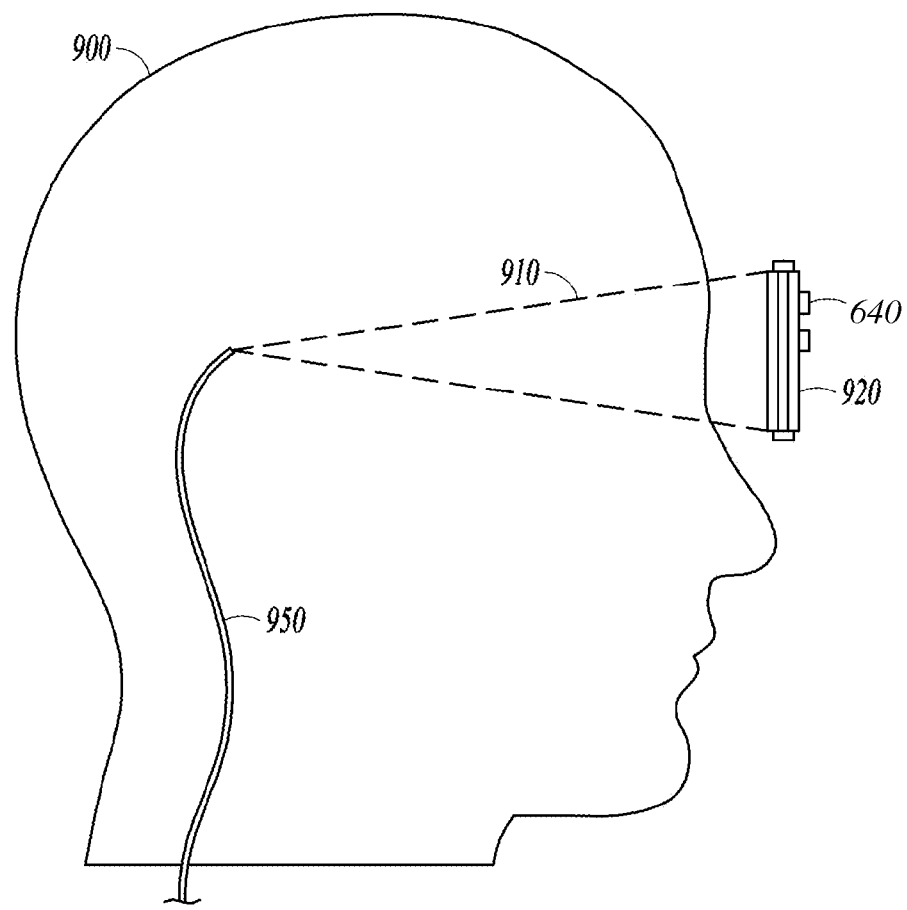
FIG. 4 is a side view representation of head-mounted display apparatus according to an example embodiment employing a direct view display.

FIG. 4 is a side view representation of a user 900 wearing an immersive binocular viewer 910 in a head-mounted display in accordance with an exemplary embodiment. Inside the head-mounted display apparatus is at least one image display system 920 for each eye. In this embodiment, the at least one image display system 920 is mounted to the HMD's frame directly in front of the user's eyes and oriented essentially vertically such that the pixels emanate light directly in the direction of the user's eyes for an immersive virtual world experience. As with the reflective embodiment of FIGS. 2-3, the direct view embodiment of FIG. 4 includes a control system 640, the same considerations as discussed above with regard to the control system being applicable to the direct view embodiment. Power and video to and from the binocular viewer can be provided through a transmission cable 950 or wireless medium.

In addition to the structures and optical systems shown in FIGS. 1-4, the HMDs of the aim assist systems disclosed herein can employ a variety of other types of HMD structures and optical systems, now known or subsequently developed. As just one example, both the direct view and reflective HMD embodiments discussed above can employ one or more Fresnel lenses of the type disclosed in commonly-assigned and co-pending U.S. patent application Ser. No. 13/211,365, filed on Aug. 17, 2011, in the names of G. Harrison, D. Smith, and G. Wiese, entitled "Head-Mounted Display Apparatus Employing One or More Fresnel Lenses," the contents of which are incorporated herein by reference. Reference number 115 illustrates a representative placement for such Fresnel lenses in the embodiment of FIGS. 2-3. When used, Fresnel lenses would have a similar relationship to the image display device in the embodiment of FIG. 4. Other variations in the structure and construction of a HMD suitable for use in an aim assist system will be evident to persons skilled in the art from the present disclosure.

II. Aim Assist Systems

For an individual to fire a weapon with accuracy, the individual needs to look down the site of the barrel and possibly close one eye before taking a shot. This method greatly reduces the range of view (field of view) of the individual. In accordance with an embodiment, a head-mounted display apparatus (head-mounted display device) is provided which produces an icon, e.g., a crosshair (any shape or color), in a viewing area that tracks the expected (predicted) endpoint of the weapon's ammunition as the weapon and/or the viewing area is moved. The display apparatus allows the individual to aim his/her weapon using the computer-generated icon (e.g., computer-generated crosshair) without closing an eye or looking down the barrel of the weapon.

As the individual moves the weapon in any direction, the icon mimics the weapon's ammunition endpoint. Likewise, as the individual moves his/her head and thus the head-mounted display apparatus, the icon moves so that the weapon's ammunition endpoint is at the appropriate location within the user's current viewing area (user's current forward field of view).

As discussed below, in various embodiments, wired or wireless data is obtained for the weapon's orientation from sensors located on the weapon. Alternatively, visual recognition of the weapon's orientation can be obtained from one or more cameras carried by the HMD apparatus. As also discussed below, orientation data is also obtained for the HMD apparatus and, in particular, the viewing area which the HMD apparatus provides to the user. This weapon and HMD orientation data, as well as data regarding the ballistics of the weapon's ammunition, is processed via a processor or other circuitry and then an endpoint for the ammunition for the current orientation of the weapon is displayed at the appropriate location in the HMD's current viewing area as augmented reality or immersively.

Icons representing the endpoint can have any shape or color to optimize a viewer's perception. Additional information such as text may be presented to the viewing area such as distance between the viewer and the weapon's ammunition endpoint corresponding to where the weapon is aimed. The HMD apparatus can place a directional indicator if the weapon's ammunition endpoint is out of the viewing area and not in the direct line of site. The HMD apparatus may operate in inclement weather and total darkness, conditions where other devices, e.g., video cameras mounted on weapons, cannot operate effectively. The use of orientation data as opposed to video images allows processing of the orientation data to provide an endpoint representation without regard to visibility of a target.

Figure 5:
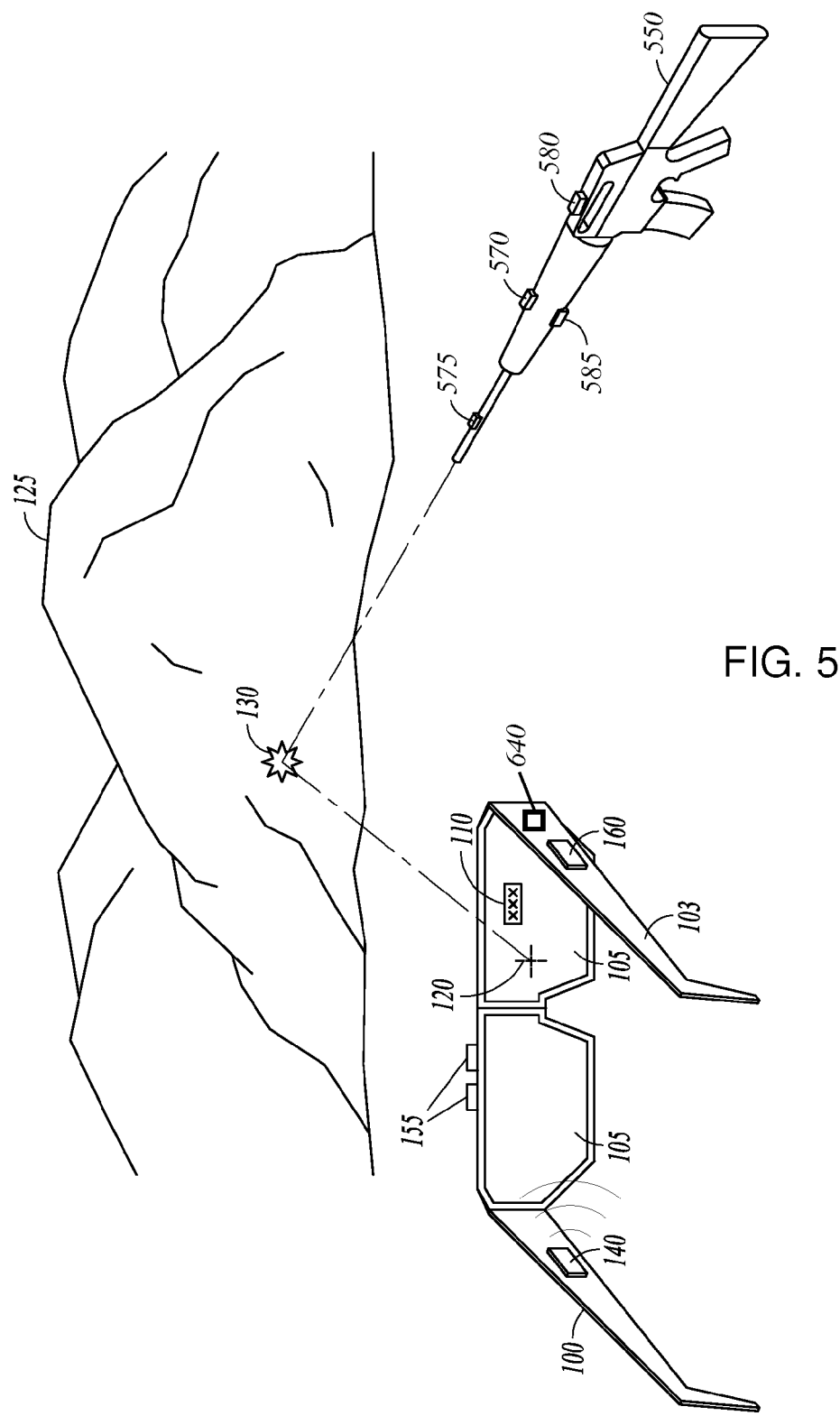
FIG. 5 is a perspective block diagram representation of a head-mounted display apparatus with a representation of an endpoint for ammunition of a separate weapon according to an example embodiment.

In FIG. 5, the HMD apparatus 100 is formed like a pair of glasses to be worn by a user. For the exemplary embodiment shown, the HMD apparatus has a frame 103, illustrated as stems shaped to go over an ear and a nose piece to provide support. As discussed above, the frame may also be in the form of a strap and goggles or other shape suitable for supporting the viewing area 105 in an established relationship with one or both eyes of a user.

In one embodiment, the HMD apparatus 100 is an immersive device having a viewing area that is entirely computer generated. In another embodiment, the HMD apparatus 100 is an augmented reality device, e.g., an optical see-through device with a see-through viewing area 105 provided for each eye of the user, whereby the user can view actual (natural) terrain within his/her forward field of view. The augmented reality HMD apparatus 100 is configured to superimpose virtual objects or images on the real world viewable through the viewing area 105. In one embodiment, the virtual objects may be 2D objects or 3D objects.

FIG. 5 illustrates the overlaying of icon 120 (e.g., a crosshair) on the viewing area 105, as well as overlaying of text 110. Such overlaying may be accomplished using a suitable driver which, as discussed above, is part of the HMD apparatus's control system 640. The driver may be a software-controlled mechanism for displaying information in the viewing area 105 such as that used to overlay information in augmented reality or immersive HMD devices.

As discussed above, combining a real world view with a virtual object or image can be done by projecting the virtual object or image through a partially reflective mirror (beam splitter) and viewing the real world directly through the mirror. As also discussed above, combining a real-world view with a virtual object or image can also be done electronically by accepting video of a real world view from a camera 160 and mixing it electronically with the virtual object or image. In one embodiment, the camera 160 may take real-time video of the real world or terrain and provide such real-time video to the viewing area of the HMD apparatus.

In an embodiment, the virtual object or image is aligned/registered with the real world image before being displayed to the user. Otherwise the real world and virtual objects/images may be offset in position relative to one another, which can confuse the user. For example, such confusion can occur where a real and a virtual image contain the same scene and features of the scene appear in different places in the field of view of the user through the HMD apparatus. The alignment/registration of the real world view with virtual objects/images generated by a processor can be performed by correlating the virtual objects/images to the real world based on the position of the HMD apparatus being worn by a user.

In one embodiment, HMD apparatus 100 includes a receiver 140 embedded in a frame of the HMD apparatus 100 or a separate processor to receive and process weapon orientation information from a weapon 550. For example, processing can be performed in control system 640. The processor may also be separate from the HMD apparatus, e.g., the processor can be configured to be worn or attached to the clothing or body of the user. The receiver 140 may be compatible with Bluetooth technology or other wireless communication protocols.

The HMD apparatus 100 may also receive or have stored information related to the type of weapon, ammunition information and/or ammunition ballistics. Weapon 550 in one embodiment includes a transmitter to transmit the weapon orientation to the HMD apparatus 100 or to the separate processor. The ammunition information and ammunition ballistics may be pre-stored, provided by the weapon 550, or provided by some other source via wired or wireless communications. Processing to correlate the weapon orientation information to the terrain being viewed may be performed in the HMD apparatus 100, such as by a processor or other electronic calculating device in the receiver 140 or the control system 640, or may be separate from the receiver and the control system.

The icon 120 is registered to the real world viewed in the viewing area 105 so that the icon 120 is closely aligned and registered to the calculated endpoint of ammunition. The icon 120 is then displayed in the viewing area 105 to correspond to actual location 130 in the view of terrain 125. In various embodiments, the crosshair may be placed in one viewing area 105, or in both. The HMD apparatus 100 may be configured to control in which viewing area(s) the crosshair appears.

In one embodiment, the HMD apparatus 100 includes one or more gyroscopes and/or accelerometers 155, supported by frame 103, to provide orientation information regarding the HMD apparatus. The orientation information may be used in conjunction with absolute geospatial position coordinates or information regarding the HMD apparatus to correlate the view of the terrain or real world with the sensed weapon's orientation and thereby properly position the icon (crosshair) 120.

The orientation information can comprise x, y, and z positional coordinates and angular orientation coordinates (such as, roll, pitch, and yaw) of the viewing area in one embodiment. In further embodiments, the information may be in form of radial coordinates, aspherical coordinates, or other types of coordinates. The information may also take the form of quaternions, cosine matrices, Euler angles, and others.

The absolute geospatial position coordinates may be provided by an embedded global positioning system (GPS) in the HMD apparatus 100, or an external mechanism which calculates the position of the HMD apparatus. Camera 160 may be used to provide image information which may be used to calibrate the orientation information to ensure that the information correlates well to the terrain being viewed. Such calibration may account for normal drift inherent in gyroscopes.

The GPS may be a Global Positioning System (GPS)-Aided Inertial Navigation System (INS) that comprises both a GPS and an INS. An INS is a navigation system that uses a computer, motion sensors (accelerometers), and rotation sensors (gyroscopes) to continuously calculate via dead reckoning the position, angular orientation, and velocity (direction and speed of movement) of a moving object without the need for external references. A GPS is a navigation system that uses satellites to act as reference points for the calculation of position location. The INS can comprise accelerometers and gyroscopes that can augment position data from the GPS. The HMD apparatus 100 can thus have orientation data for all six degrees of freedom of the HMD device 100 including three degrees of angular orientation (roll, pitch, yaw) and three degrees of position (x, y and z).

In one embodiment, weapon 550 may have one or more gyroscopes and/or accelerometers 570 and a camera 575 that perform similar functions to those on the HMD apparatus 100. The one or more gyroscopes and/or accelerometers 570 provide weapon orientation information. The orientation information may include absolute geospatial position coordinates or information regarding the weapon 550 which can be used to correlate the real world view provided by HMD apparatus 100 with the sensed weapon's location absolute geospatial position information and thereby properly position and register the icon 120. The orientation information regarding weapon 550 can comprise x, y, and z positional coordinates and angular orientation coordinates (such as, roll, pitch, and yaw) in one embodiment. Roll, pitch, and yaw need not all be provided if the endpoint of the ammunition for the weapon is not dependent on all of them. The absolute geospatial position coordinates may be provided by an embedded global positioning system (GPS) associated with the weapon 550, or an external mechanism which calculates the position of the weapon.

Camera 575 may be used to provide image information which may be used to calibrate the orientation information to ensure that the information correlates well to the terrain being viewed in, for example, a see-through viewing area 105 of an augmented reality embodiment. Image data from the weapon 550 may also be provided to the HMD apparatus for use in correlating the positioning of icon 120 relative to the terrain being viewed through or on viewing area 105.

Weapon 550 may also include suitable range sensing and processing apparatus 580, as well as a transmitter or transceiver 585 to calculate the endpoint for ammunition being fired and provide information to the HMD apparatus 100. Alternatively, the calculation can be performed by a processor on the HMD apparatus, e.g., a processor that is a part of control system 640, or a processor may be provided which is separate from the weapon 550 and HMD apparatus 100. As discussed above, wherever the processing is performed, ultimately the endpoint information is used by the HMD apparatus, specifically, by the driver of control system 640, to position and display icon 120 in viewing area 105.

In one embodiment, for either or both of the head-mounted display apparatus and the weapon, at least one gyroscope provides updated orientation information at a frequency of at least approximately 60 Hz. In further embodiments, the gyroscope update may be performed at a slower rate and still operate well if it uses dead reckoning to update positioning with velocity and acceleration information. In some embodiments, a slower update rate may be used with different mathematical processing such as Kalman filters or dead reckoning using velocity and acceleration. Information from one or more accelerometers may also be used. The updated orientation information improves the ability of the HMD apparatus to display the expected impact point for a specific ammunition ballistic in viewing area 105.

In some embodiments, a user can link their HMD physically, such as via a wired or wireless link, with a local vehicle or established reference point that allows the HMD's internal inertial reference system (when used) to calibrate to a known location and angular orientation before a duration of operation in the field. This duration of operation in one embodiment is less than the duration it takes for the internal inertial reference system, composed of the gyroscopes, accelerometers, and a processor, to drift outside of a nominally useful error band.

The terrain being viewed by the user of the HMD apparatus may be computer generated in the case of an immersive embodiment, or may be real terrain viewed through the viewing area 105 in the case of an augmented reality embodiment. In an augmented reality HMD apparatus 100, the viewing area 105 may include a beam splitter. The icon 120 and data 110 may be provided by a separate display in the HMD apparatus that is reflected by the beam splitter to the user's eyes while allowing light from the terrain to pass through glass or a lens of the viewing area 105 to the eyes of the user. The viewing area 105 of the HMD device may be configured as a transparent display that allows light from the terrain or real world to pass through glass or a lens of the viewing area 105 to the eyes of the user. In another augmented reality embodiment, the view area 105 may include a transparent organic light emitting diode (OLED) display constructed and arranged to provide a wide field of view in a horizontal plane.

As discussed above and illustrated in FIG. 5, the weapon 550 and the HMD apparatus 100 are separate from each other and independently moveable. With the weapon fixed on a target, the wearer of the HMD apparatus may move his or her head, and the displayed aim point will stay fixed on a calculated endpoint of the ammunition of the weapon 550. The weapon may also be moved, resulting in movement of the calculated endpoint and corresponding displayed aim point. In an embodiment, when the weapon is a small-arms weapon, the endpoint is provided to the user without the need for the user to look down the site of the weapon's barrel.

Figure 6:
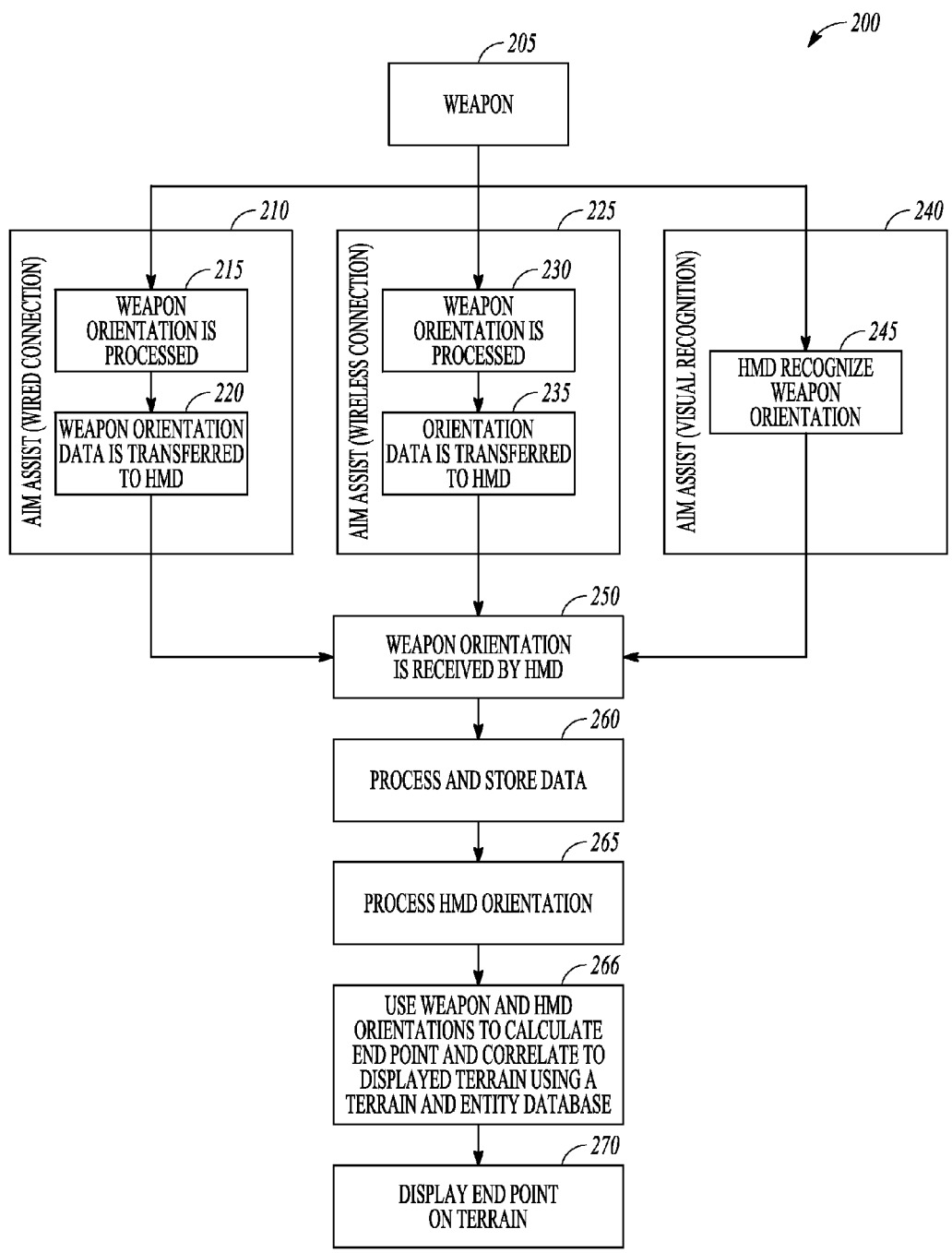
FIG. 6 is a block flow diagram illustrating a method of determining an endpoint and displaying the endpoint on a head-mounted display apparatus according to an example embodiment.

FIG. 6 is a block flow diagram illustrating methods 200 of providing aim assist information to a user. Portions of the method 200 may be performed by the weapon represented at block 205, while other portions may be performed by the HMD apparatus in various embodiments. In one embodiment, the weapon may be wired to the HMD apparatus as indicated at block 210. Weapon orientation is processed at block 215 to determine where the weapon is aimed, and weapon orientation information is then transferred to the HMD apparatus at block 220 via the wired connection or a separate processor. In a further embodiment, a wireless connection is represented at block 225. Weapon orientation is processed at block 230 to determine where the weapon is aimed, and weapon orientation information is then transferred to the HMD apparatus at block 235 via the wireless connection or a separate processor. In a third embodiment illustrated at block 240, visual information or other information collected by the HMD apparatus is used to recognize the weapon orientation as indicated at block 245. Images of the weapon in the context of the terrain may be compared to a model of the weapon. Distances to a target, weapon type or model, ammunition type, ammunition ballistics and/or orientation of the weapon may be used via the images to calculate an expected endpoint for the ammunition based upon a calculated trajectory, and where that trajectory intersects the terrain.

At block 250, the weapon orientation data is received by the HMD apparatus' processor or a separate processor. That information is processed and stored at block 260 to ensure that the data is in a form that can be displayed relative to the terrain being viewed via the HMD apparatus. The data may include x, y, and z positional coordinates as well as angular orientation coordinates (such as, roll, pitch, and yaw). In some embodiments, GPS coordinates or actual images may be provided.

At block 265, orientation data for the HMD apparatus is processed to determine the orientation of the HMD apparatus with respect to the terrain and to correlate the terrain to the endpoint information. Also, at block 266 the received data for the weapon, orientation data for the HMD apparatus, as well as ammunition ballistics and information from a terrain and entity database are used to calculate the expected endpoint position of the ammunition relative to the viewing area of the HMD apparatus. Specifically, in block 266, the terrain and entity database may be used to determine the endpoint position, which is where the trajectory of the ammunition intersects the terrain, or an entity, optionally moveable, that exists in the terrain. At block 270, the HMD apparatus displays the processed data such that an icon representing the ammunition endpoint or expected impact point is displayed on the terrain as an aimpoint, or if the endpoint of ammunition is outside the current field of view, an icon may be displayed that represents the direction of the endpoint of ammunition. As the wearer changes the field of view, the icon will change to an aimpoint when the endpoint enters the field of view.

In various embodiments, the equipment of FIG. 5 and the process of FIG. 6 allows individuals to see the crosshair of a weapon's expected ammunition destination point within the HMD apparatus without looking down the barrel of the weapon and obstructing the user's view. An individual will be able to remain behind cover while aiming the weapon. In an embodiment, while the user remains behind cover, the obscured terrain may be viewed in the viewing area 105 on the HMD apparatus by terrain data available through various sources such as, without limitation, satellite imagery or pre-stored terrain data. The weapon may be a mortar or other weapon capable of high-arcing ballistic trajectories. The expected point of impact of high-arching ballistic ammunition may be calculated by the HMD apparatus or a separate processor prior to shooting the weapon while behind cover. This technology will help protect individuals in battle situations and enhance awareness, even when a target is out of direct line of sight by the HMD apparatus, the weapon, or both the HMD apparatus and the weapon. In some embodiments, the process of taking a shot on a target while maintaining a full view of the field, by representing the crosshairs in the HMD apparatus, is shortened.

Figure 7:
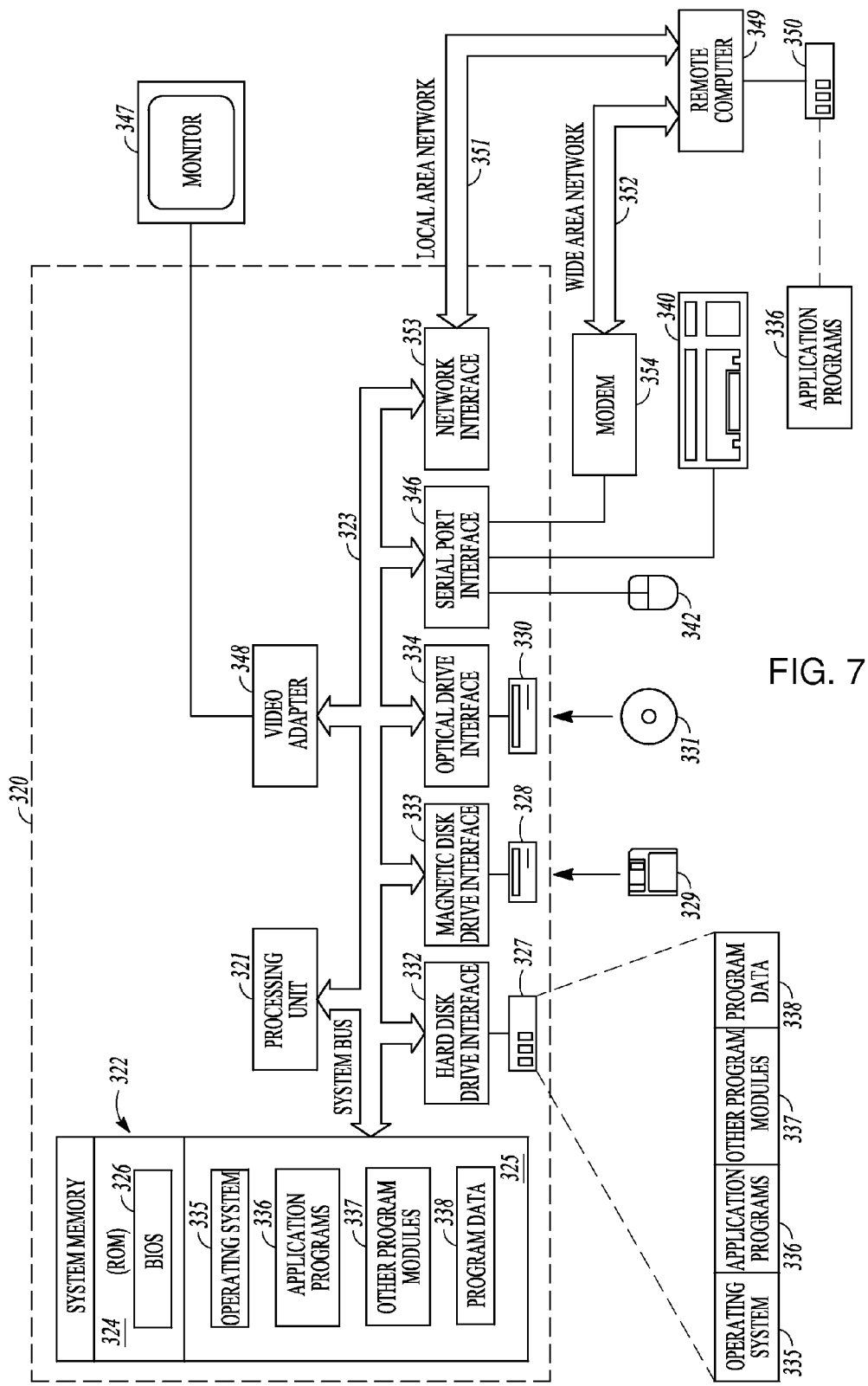
FIG. 7 is a block diagram of an example processing system for performing one or more portions of methods described herein.

FIG. 7 is a block diagram of a computer system to implement methods according to an example embodiment. In the embodiment shown in FIG. 7, a hardware and operating environment is provided that may be applicable to execute drivers, location identification, orientation identification and other functions described herein. Many of the elements of FIG. 7 may be removed or reduced appropriate to the functions to be performed. Also, parts of the computer system can be located remotely from the HMD, e.g., hard discs, monitors, keyboards, etc., with other parts located on the HMD, e.g., as part of control system 640. When located remotely, communication to and from the HMD apparatus can be wired or wireless, e.g., through the use of a transceiver mounted on the HMD (see, for example, reference number 140 in FIG. 5). The remote parts of the computer system can be carried by the user or can be located on a vehicle or housed in a permanent facility. Parts of the computer system can also be implemented in a "cloud computing" environment if desired.

As shown in FIG. 7, one embodiment of the hardware and operating environment includes a general purpose computing device in the form of a computer 320 (e.g., a personal computer, workstation, or server), including one or more processing units 321, a system memory 322, and a system bus 323 that operatively couples various system components including the system memory 322 to the processing unit 321. There may be only one or there may be more than one processing unit 321, such that the processor of computer 320 comprises a single central-processing unit (CPU), or a plurality of processing units, commonly referred to as a multiprocessor or parallel-processor environment. In various embodiments, computer 320 is a conventional computer, a distributed computer, or any other type of computer.

The type of weapon, ammunition information and/or ammunition ballistics may be stored in the system memory 322 or other memory components. The terrain and entity database and ammunition ballistics as well as other stored information generated, processed, or received by the HMD apparatus may be stored in system memory 322 or other memory components.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 325. A basic input/output system (BIOS) program 326, containing the basic routines that help to transfer information between elements within the computer 320, such as during start-up, may be stored in ROM 324. The computer 320 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non-volatile storage of computer-readable instructions, data structures, program modules and other data for the computer 320. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324, or RAM 325, including an operating system 335, one or more application programs 336, other program modules 337, and program data 338. Programming for implementing one or more processes or methods described herein may be resident on any one or a number of these computer-readable media.

A user may enter commands and information into computer 320 through input devices such as a keyboard 340 and pointing device 342. Other input devices (not shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type of display device can also be connected to the system bus 323 via an interface, such as a video adapter 348. The monitor 347 can display a graphical user interface for the user of the monitor which corresponds to the information being displayed on the HMD. In addition to the monitor 347, computers typically include other peripheral output devices (not shown), such as speakers and printers.

The computer 320 may operate in a networked environment using logical connections to one or more remote computers or servers, such as remote computer 349. These logical connections are achieved by a communication device coupled to or a part of the computer 320; the invention is not limited to a particular type of communications device. The remote computer 349 can be another computer, a server, a router, a network PC, a client, a peer device or other common network node, and typically includes many or all of the elements described above in connection with computer 320, although only a memory storage device 350 has been illustrated. The logical connections depicted in FIG. 7 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 320 is connected to the LAN 351 through a network interface or adapter 353, which is one type of communications device. In some embodiments, when used in a WAN-networking environment, the computer 320 typically includes a modem 354 (another type of communications device) or any other type of communications device, e.g., a wireless transceiver, for establishing communications over the wide-area network 352, such as the internet. The modem 354, which may be internal or external, is connected to the system bus 323 via the serial port interface 346. In a networked environment, program modules depicted relative to the computer 320 can be stored in the remote memory storage device 350 of remote computer or server 349. It is appreciated that the network connections shown are exemplary and other means of, and communications devices for, establishing a communications link between the computers may be used including hybrid fiber-coax connections, T1-T3 lines, digital subscriber lines (DSLs), optical carrier (OC) transmission rates OC-3 and/or OC-12, TCP/IP (Transmission Control Protocol/Internet Protocol), microwave, wireless application protocol, and any other electronic media through any suitable switches, routers, outlets and power lines, as the same are known and understood by one of ordinary skill in the art.

The functions or algorithms described herein may be implemented in software, hardware, firmware, or combinations thereof. The software may consist of computer executable instructions stored on non-volatile computer readable media such as memory or other type of storage devices. Further, such functions can correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of the disclosed embodiments. For example, structural, logical, and electrical changes may be made to those embodiments.

It is to be understood that the above description is intended to be illustrative, and not restrictive, and that the phraseology or terminology employed herein is for the purpose of description. The following claims are intended to cover the specific embodiments set forth herein as well as modifications, variations, and equivalents of those embodiments.

What is claimed is:

1. A system comprising:
   a viewing area comprising a first image display device and a first reflective surface that corresponds to a first eye of a user and a second image display device and a second reflective surface that corresponds to a second eye of the user;
   a head-supported frame to support the viewing area in front of the eyes of the user; and
   a control system, comprising:
      a processor configured to:
         determine an orientation of a weapon controlled by the user;
         determine an ammunition type that identifies a type of round associated with the weapon;
         based on the ammunition type, determine ammunition ballistic data that identifies trajectory data associated with the ammunition type;
         determine a field of view of the user based on an orientation of the viewing area;
         based on the field of view, access a database to identify terrain within the field of view;
         based at least in part on the ammunition ballistic data, the orientation of the weapon, and the terrain, determine a calculated endpoint that identifies an intersection location between a round fired from the weapon and the terrain;
      a driver configured to display a visual indication on the viewing area corresponding to the calculated endpoint, wherein the user sees the visual indication embedded in the field of view of the user, a first representation of the field of view being provided to the first eye of the user via the first image display device and a second representation of the field of view being provided to the second eye of the user via the second image display device.

2. The system of claim 1 wherein the system comprises sensors mounted to the frame to sense the orientation and location of the viewing area.

3. The system of claim 2 wherein the sensors comprise at least one gyroscope providing updated orientation or location information.

4. The system of claim 1 wherein the viewing area is part of an immersive head-mounted display apparatus or an augmented head-mounted display apparatus.

5. The system of claim 1 wherein the visual indication comprises an icon representing a direction of the calculated endpoint that is located outside the field of view.

6. The system of claim 1 wherein the frame comprises an embedded receiver to receive weapon orientation data that identifies the orientation of the weapon.

7. The system of claim 6 wherein the weapon provides the weapon orientation data to the embedded receiver.

8. The system of claim 1 wherein the frame comprises a camera to obtain images representative of the orientation of the weapon.

9. The system of claim 1 further comprising a remote display wherein the visual indication is viewable on the remote display.

10. The system of claim 1 wherein the driver is further configured to display data on the viewing area that identifies a distance between the user and the calculated endpoint.

11. The system of claim 1, wherein the control system is further configured to, based on a changing orientation of the weapon over a period of time, continuously determine calculated endpoints based at least in part on the ammunition ballistic data, the changing orientation of the weapon, and the terrain; and the driver is further configured to display visual indications on the viewing area corresponding to the calculated endpoints over the period of time, wherein the user sees the visual indications embedded in the field of view of the user moving in conjunction with the changing orientation of the weapon.

12. A method comprising:

receiving information that identifies an orientation of a weapon of a user, and an ammunition type that identifies a type of round associated with the weapon;

based on the ammunition type, determining ammunition ballistic data that identifies trajectory data associated with the ammunition type;

receiving information regarding an orientation and a location of a viewing area of a head-mounted display apparatus, the viewing area comprising a first image display device and a first reflective surface that corresponds to a first eye of the user and a second image display device and a second reflective surface that corresponds to a second eye of the user;

determining a field of view of the user based on the orientation of the viewing area;

based at least in part on the ammunition ballistic data, the orientation of the weapon, and terrain, determine a calculated endpoint that identifies an intersection location between a round fired from the weapon and the terrain; and displaying an icon representative of the calculated endpoint on the viewing area, a first representation of the field of view being provided to the first eye of the user via the first display device and a second representation of the field of view being provided to the second eye of the user via the second display device.

13. The method of claim 12 wherein information regarding the orientation of the viewing area is provided by at least one gyroscope supported on the head-mounted display apparatus.

14. The method of claim 13 further comprising:

receiving an image of terrain within the field of view from a camera on the head-mounted display apparatus; and calibrating the at least one gyroscope as a function of the image.

15. The method of claim 12 wherein information regarding the orientation of the weapon is provided by at least one gyroscope supported on the weapon.

16. The method of claim 15 further comprising:

receiving an image of terrain in a direction of fire of the weapon from a camera on the weapon; and calibrating the at least one gyroscope as a function of the image.

17. The method of claim 12 wherein the head-mounted display apparatus is an augmented-reality, head-mounted display apparatus employing a beam splitter.

18. The method of claim 12 further comprising displaying data on the viewing area that identifies a distance between the user and the calculated endpoint.

* * * * *